United States Patent
Zucchi et al.

(10) Patent No.: US 8,141,608 B2
(45) Date of Patent: Mar. 27, 2012

(54) APPARATUS FOR MANUFACTURING EXTRUDED COILED TUBES FOR MEDICAL PURPOSES

(75) Inventors: Giuseppe Zucchi, S. Possidonio (IT); Daniele Resca, San Felice sul Panaro (IT); Elisa Romagnoli, Cento (IT)

(73) Assignee: Covidien AG, Neuhausen am Rheinfall (CH)

( * ) Notice: Subject to any disclaimer, the term of this patent is extended or adjusted under 35 U.S.C. 154(b) by 433 days.

(21) Appl. No.: 12/556,706

(22) Filed: Sep. 10, 2009

(65) Prior Publication Data
US 2010/0126670 A1    May 27, 2010

(30) Foreign Application Priority Data

Nov. 26, 2008 (EP) .................................. 08425760

(51) Int. Cl.
*B32B 37/00* (2006.01)
*B65H 81/00* (2006.01)

(52) U.S. Cl. ........ 156/425; 156/190; 156/192; 156/195; 156/244.13; 156/244.24; 156/428; 156/429; 156/430; 156/500

(58) Field of Classification Search .................. 156/195, 156/192, 190, 500, 425, 428, 429, 430, 244.13, 156/244.24
See application file for complete search history.

(56) References Cited

U.S. PATENT DOCUMENTS

| | | | | |
|---|---|---|---|---|
| 3,532,580 A | * | 10/1970 | Kanao | 156/432 |
| 4,043,856 A | * | 8/1977 | Steward | 156/195 |
| 4,343,672 A | * | 8/1982 | Kanao | 156/428 |
| 4,867,671 A | * | 9/1989 | Nagayoshi et al. | 425/391 |
| 5,330,345 A | | 7/1994 | Strock et al. | |

FOREIGN PATENT DOCUMENTS

| | | | |
|---|---|---|---|
| GB | 1 451 469 A | | 10/1976 |
| GB | 1 557 849 A | | 12/1979 |
| GB | 2 102 528 A | | 2/1983 |
| JP | 50-31198 B | * | 10/1975 |

OTHER PUBLICATIONS

European Search Report for Appln. No. 08 42 5760 completed Jun. 12, 2009.

* cited by examiner

*Primary Examiner* — Jeff Aftergut
(74) *Attorney, Agent, or Firm* — Carter, DeLuca, Farrell & Schmidt LLP

(57) ABSTRACT

An apparatus for manufacturing extruded coiled tubes for medical purposes is provided which includes rotary shafts protruding from a spindle, each rotary shaft being coupled to a respective flexible shaft resting on a series of supporting elements substantially equidistant to each other and supported by a main central shaft; at least an extrusion head to extrude a ribbon, and at least an extrusion head to extrude a rib; the ribbon and the rib being co-extruded, side by side, and being wound on an ideal surface formed by the external surfaces of the flexible shafts. The apparatus is characterized in that for changing the pitch with which the rib is wound on a base tubular element, formed on its turn by the winding coil of the ribbon, at least two twisting bars operated by a crank are used to rotate the supporting elements with a pre-defined angle.

11 Claims, 3 Drawing Sheets

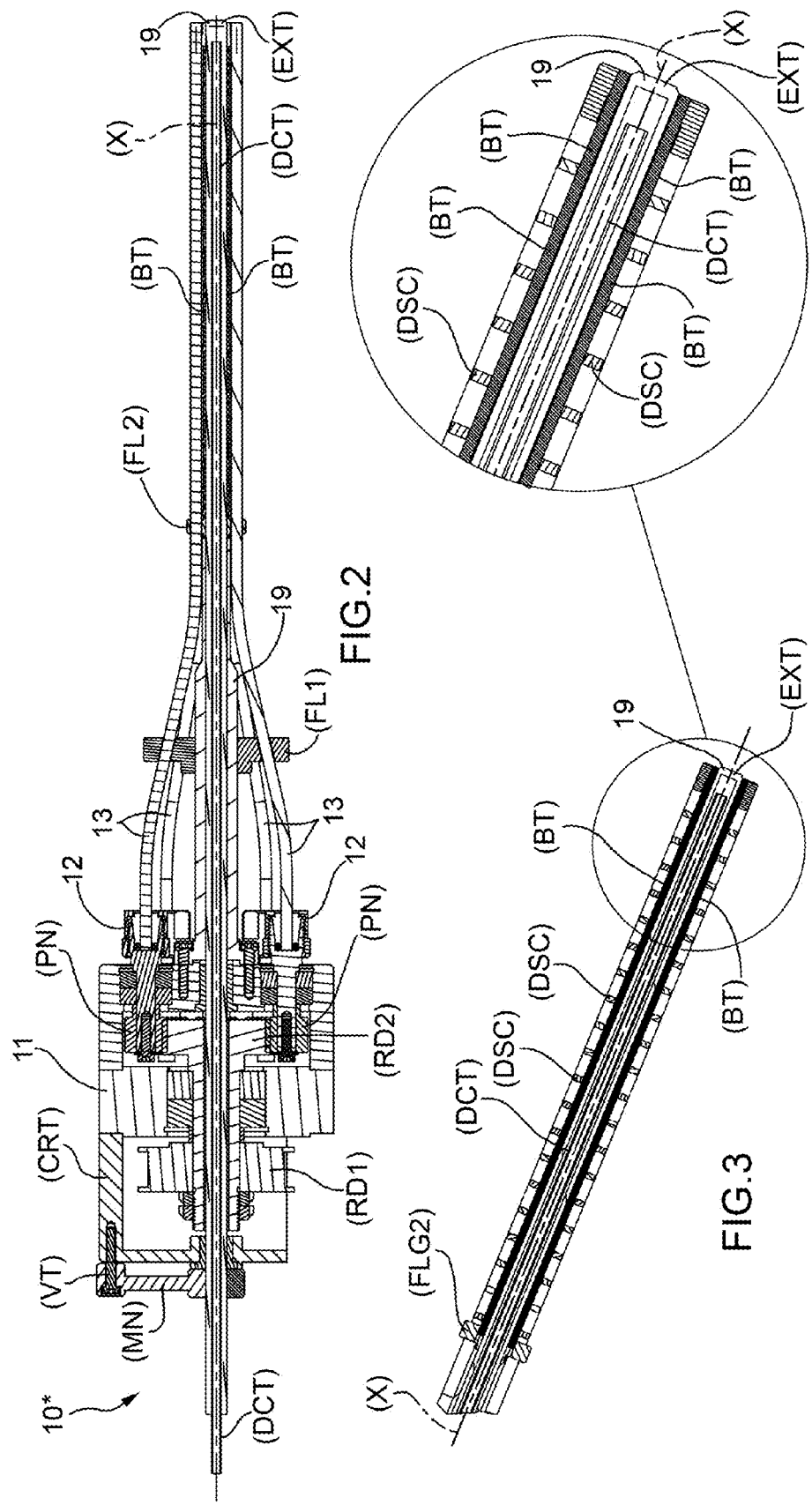

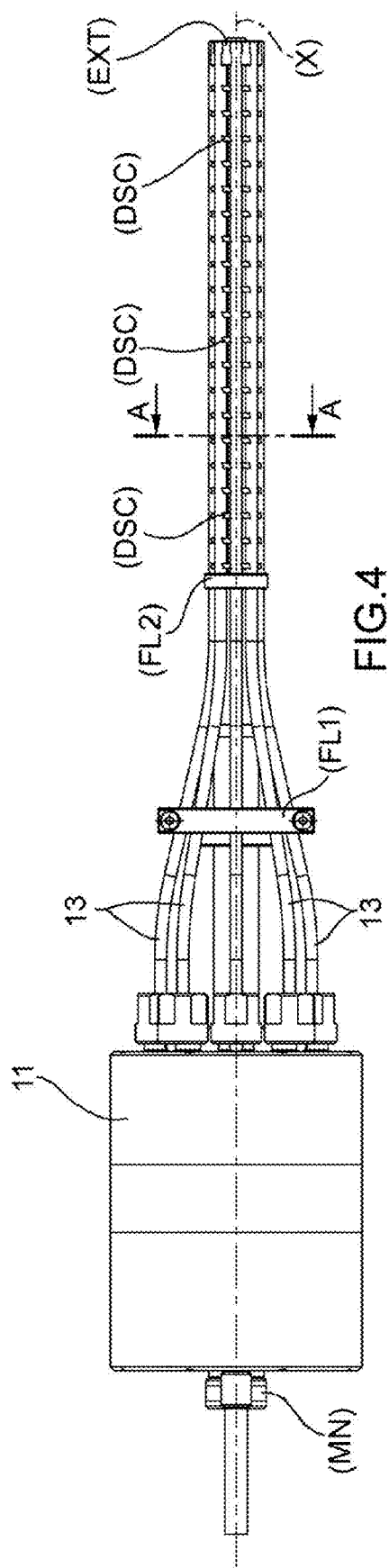
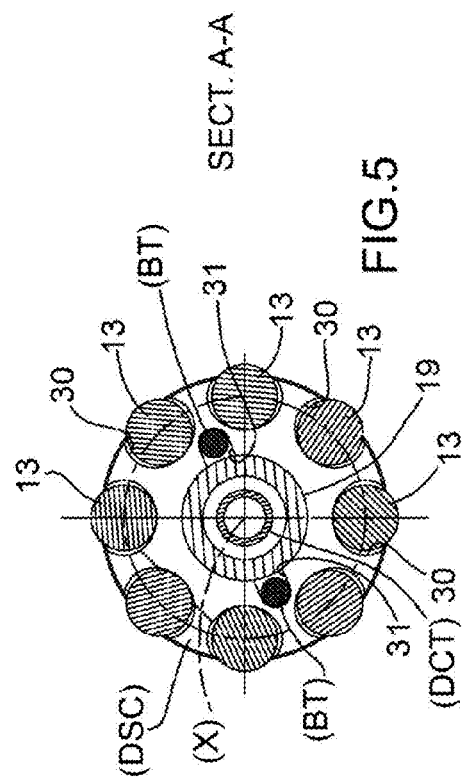
FIG.4
FIG.5
SECT. A-A

US 8,141,608 B2

APPARATUS FOR MANUFACTURING EXTRUDED COILED TUBES FOR MEDICAL PURPOSES

TECHNICAL FIELD

The present disclosure concerns an apparatus for manufacturing extruded coiled tubes for medical purposes.

BACKGROUND

Presently, the manufacture of coiled PVC tubes is carried out by means of the extrusion of a ribbon of soft material and of a rib of a relatively stiff material. These two components are co-extruded in a coil on a series of flexible rotary shafts mounted on a main fixed shaft for keeping them on track.

On their turn, the flexible rotary shafts are mounted on a central shaft by means of a plurality of supporting elements with an inclination defining the pitch of the rib on the tube. During the formation of the coiled tube, every pitch causes a partial overlapping of the components ("ribbon" and "rib"), thus provoking, together with high temperatures, the welding of the overlapping areas and therefore the forming of the coiled tube. The presently available systems, however, have some drawbacks.

In fact, the pitch of the rib on the coiled tube can be changed only by manually varying the position of the supporting elements by rotating them around a substantially longitudinally symmetric axis of the main central shaft and by fixing them in a new angular position by means of allen keys to the main central shaft. Furthermore, once a value is determined for the pitch of the rib, for varying this pitch, the apparatus must be stopped and the supporting elements must be rotated and then locked in a new angular position to define the new desired pitch. All this clearly involves a remarkable loss of time and a consequent loss of production.

Moreover, there is an increasing need of ribs having different pitches and stiffness but placed on the same tube. In fact, the areas of the tube provided with less stiff ribs and with a lower pitch can be used with relatively soft joints to be directly coupled with stiff tubes. This may involve a more cost effective process due to the complete absence of joints to be associated to the coiled tubes to allow their assortment on stiff joints.

SUMMARY

Apparatus for manufacturing extruded coiled tubes for medical purposes is provided which includes a plurality of rotary shafts protruding from a spindle, each rotary shaft being coupled to a respective flexible shaft resting on a series of supporting elements substantially equidistant to each other and supported by a main central shaft; a first extrusion head to extrude a ribbon, and a second extrusion head to extrude a rib; said ribbon and said rib being co-extruded, side by side, and being wound on an ideal surface formed by external surfaces of the flexible shafts; wherein the rib is wound on a base tubular element, formed, on its turn, by the winding coil of the ribbon; and external mechanical means to rotate said series of supporting elements with a pre-defined angle for changing a winding angle of the flexible shafts around said main central shaft such that a pitch of the apparatus is changed.

BRIEF DESCRIPTION OF THE FIGURES

Various embodiments of the present disclosure will be described herein below with reference to the figures wherein:

FIG. 2 shows a longitudinal section of an apparatus for manufacturing extruded coiled tubes for medical purposes according to the present disclosure;
FIG. 3 shows a detail (with a relative enlargement) of the apparatus of FIG. 2;
FIG. 4 shows a top view of the apparatus of FIG. 2;
and
FIG. 5 shows a cross section A-A of the apparatus shown in FIG. 4.

DETAILED DESCRIPTION

Figure 1:
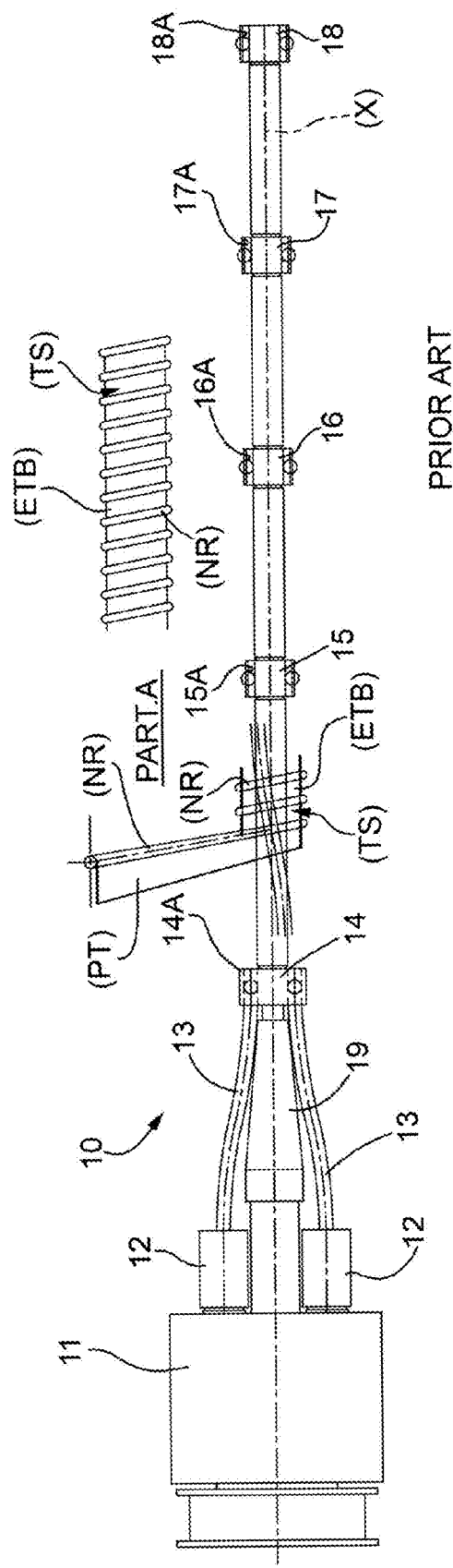
FIG. 1 illustrates an extrusion apparatus of the prior art.

The present disclosure provides an apparatus for manufacturing extruded coiled tubes for medical purposes in which the pitch of the rib can be quickly changed. In embodiments, the present disclosure provides an apparatus for manufacturing extruded coiled tubes for medical purposes which includes rotary shafts protruding from a spindle, each rotary shaft being coupled to a respective flexible shaft resting on a series of supporting elements substantially equidistant to each other and supported by a main central shaft; at least an extrusion head to extrude a ribbon, and at least an extrusion head to extrude a rib; the ribbon and the rib being co-extruded, side by side, and being wound on an ideal surface formed by the external surfaces of the flexible shafts. The apparatus is characterized in that, for changing the pitch with which the rib is wound on a base tubular element, formed on its turn by the winding coil of the ribbon, at least two twisting bars operated by a crank are used to rotate the supporting elements with a pre-defined angle.

An embodiment of an extrusion apparatus 10 presently in use, and therefore belonging to the prior art, is shown in FIG. 1. Apparatus 10 includes a spindle 11 from which rotary shafts 12 protrude (only two of them are shown in FIG. 1).

Each rotary shaft 12 is associated to a relative flexible shaft 13 made of harmonic steel resting on a series of supporting elements 14, 15, 16, 17, 18, substantially equidistant from each other and supported by a main central shaft 19. The rotary shafts 12 are rotated by a single electric motor (not shown in FIG. 1), rotating a gear (also not shown in FIG. 1) engaged with a plurality of gearing (not shown), one for each rotary shaft 12. Furthermore, each flexible shaft 13 can freely rotate in seats 14A, 15A, 16A, 17A, 18A provided on the relative supporting elements 14, 15, 16, 17, 18.

In use, as shown in PART A of FIG. 1, the ribbon (PT) and the rib (NR) are co-extruded, side by side, and are wound on an ideal surface formed by the external surfaces of the flexible shafts 13. Accordingly, the external surfaces rotate together with the flexible shafts 13. More specifically, the rib (NR) is wound on a base tubular element (ETB), formed on its turn by the coil winding of the ribbon (PT). The base tubular element (ETB) together with the rib (NR) (also coiled) on the base tubular element (ETB) form the coiled tube (TS). The coiled tube (TS) is then cooled and hardened. As indicated above, the presently available systems, however, have some drawbacks.

In fact, the pitch of the rib (NR) on the coiled tube can be changed only by manually varying the position of the supporting elements 14, 15, 16, 17, 18 by rotating them around a substantially longitudinally symmetric axis (X) of the main central shaft 19 and by fixing them in a new angular position by means of allen keys to the main central shaft 19. Furthermore, once a value for the pitch of the rib (NR) is determined, for varying this pitch the apparatus 10 must be stopped and the supporting elements 14, 15, 16, 17, 18 must be rotated and then locked in a new angular position to define the new desired pitch. All this clearly involves a remarkable loss of time and a consequent loss of production.

Therefore, the object of the present disclosure is to provide for an apparatus for manufacturing extruded coiled tubes for medical purposes in which the pitch of the rib can be quickly changed.

In embodiments, an apparatus for manufacturing extruded coiled tubes for medical purposes is provided and will be discussed with reference to the figures. An embodiment of an apparatus 10*, is shown in FIGS. 2, 3, 4, 5.

With reference to the FIG. 2, a first gear (RD1) rotated by an electric motor (not shown) is illustrated. The rotation of the first gear (RD1) causes, on its turn, the rotation of a second gear (RD2), engaged with a series of pinions (PN) rotating the shafts 12 and therefore also the flexible shafts 13, which rest on a plurality of pitch spaced disks (DSC) (FIG. 4).

As shown in more detail in FIG. 5, the flexible shafts 13 are housed in peripheral seats 30 provided on the disks (DSC). In the peripheral seats 30, the flexible shafts 13 are axially inserted and can not radially protrude, although they are free to rotate in the seats 30.

As shown in FIGS. 3 and 5, the apparatus 10* includes a couple of steel twisting bars (BT). The twisting bars (BT) are substantially parallel to the axis (X). The two twisting bars (BT) are mechanically connected with a crank (MN) (FIG. 2), whose angular position is defined by a screw (VT) screwed on a casing (CRT).

As shown in FIG. 5, the two twisting bars (BT) are inserted in through holes 31 provided on the disks (DSC) and are fixed on the free end (EXT) of the central shaft 19. Also provided is an internal duct (DCT) wherein a cooling fluid (for instance, water) flows therethrough.

As shown in FIGS. 2 and 4, the apparatus 10* includes two guiding flanges (FL1), (FL2) (substantially perpendicular to the axis (X)) for guiding the flexible shafts 13 and the twisting bars (BT).

In use, the pitch of the ribs (NR) can be changed by unscrewing the screw (VT) from the casing (CRT) so that the crank (MN) is free to rotate around the axis (X) of an angle defining the new pitch of the ribs (NR). Thus, the winding angle of the flexible shafts (13) around the main central shaft 19 can be changed by rotating the disks (DSC).

Therefore, the operator rotates the crank (MN) and fastens it in a new angular position by means of the same fixing screw (VT) (screwed in a new threaded seat). The rotation of the two twisting bars (BT) causes an analogous rotation of the disks (DSC) and therefore of the flexible shafts 13. Accordingly, the ribbon (PT) and the rib (NR), winding on the ideal surface formed by the external surfaces of the flexible shafts 13, form a coiled tube (TS) having a rib (NR) with a pitch different from the previous one.

The aforesaid method for changing the rib pitch may be automatized if the crank (MN) is not manually rotated, as previously described, but is rotated by means, for example, of an actuator (not shown) controlled by an electronic control unit. In embodiments, it is possible to change not only the pitch of the ribs (NR), but also their stiffness and consistency, by varying the amount and/or the quality of the material injected during the forming of the ribs (NR). However, a pitch change in use could slow down the manufacturing speed of the coiled tube (TS). In order to solve this possible drawback, it has advantageously been proposed the use of two complete extrusion heads (namely each of them having an extruder for the ribbon and an extruder for the rib) (not shown), which are placed on opposites sides with respect to the main central shaft 19 and to the axis (X). Accordingly, a "double-threaded screw" which doubles the manufacturing rate of the coiled tube (TS) is provided.

An advantage of the apparatus of the present disclosure includes the ability to manufacture coiled tubes having ribs with different pitches without stopping the apparatus for manually adjusting the position of the supporting elements of the flexible shafts. Specifically, all adjustments of the present apparatus can be carried out without stopping the coiled tube manufacturing process. Furthermore, the presence of two couples of extrusion heads allows for doubling the manufacturing rate of the coiled tube.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. Apparatus for manufacturing extruded coiled tubes for medical purposes comprising:
   a plurality of rotary shafts protruding from a spindle, each rotary shaft being coupled to a respective flexible shaft resting on a series of supporting elements substantially equidistant to each other and supported by a main central shaft;
   a first extrusion head to extrude a ribbon, and a second extrusion head to extrude a rib; said ribbon and said rib being co-extruded, side by side, and being wound on an ideal surface formed by external surfaces of the flexible shafts;
   wherein the rib is wound on a base tubular element, formed, on its turn, by the winding coil of the ribbon;
   and external mechanical means to rotate said series of supporting elements with a pre-defined angle for changing a winding angle of the flexible shafts around said main central shaft such that a pitch of the apparatus is changed.

2. Apparatus according to claim 1, wherein said external mechanical means includes at least two twisting bars, each being housed in a respective through hole made on each of said series of supporting elements.

3. Apparatus according to claim 2, wherein said external mechanical means further comprises:
   a crank integral to said twisting bars, wherein rotation of said crank means provides a corresponding rotation of the twisting bars.

4. Apparatus according to claim 3, wherein said crank is rotated by an actuator electronically controlled by an electronic control unit.

5. Apparatus according to claim 1, wherein each flexible shaft is housed in a respective peripheral seat provided on said series of supporting elements, spaced from each other.

6. Apparatus according to claim 2, wherein each twisting bar is inserted in a respective through hole provided on each supporting element.

7. Apparatus according to claim 5, wherein the flexible shafts are axially inserted in each peripheral seat such that they do not protrude in a radial direction.

8. Apparatus according to claim 7, wherein the flexible shafts rotate inside the peripheral seats.

9. Apparatus according to claim 1, further comprising a means for varying stiffness and consistency of the ribs by changing an amount and quality of material injected during formation of the ribs.

10. Apparatus according to claim 1, further comprising two couples of complete extrusion heads, each couple having an extruder for the ribbon and an extruder for the rib.

11. Apparatus according to claim 10, wherein said two couples of complete extrusion heads are placed on opposite sides with respect to the main central shaft such that a double-threaded screw is formed wherein the rate of manufacturing of the coiled tube is doubled.

* * * * *